Sept. 21, 1965 P. P. WUESTHOFF 3,207,883
FLUX-POSITIONING MECHANISM
Filed March 21, 1963 2 Sheets-Sheet 1

INVENTOR
PAUL P. WUESTHOFF
BY Cohn and Powell
ATTORNEYS

Sept. 21, 1965 P. P. WUESTHOFF 3,207,883
FLUX-POSITIONING MECHANISM
Filed March 21, 1963 2 Sheets-Sheet 2
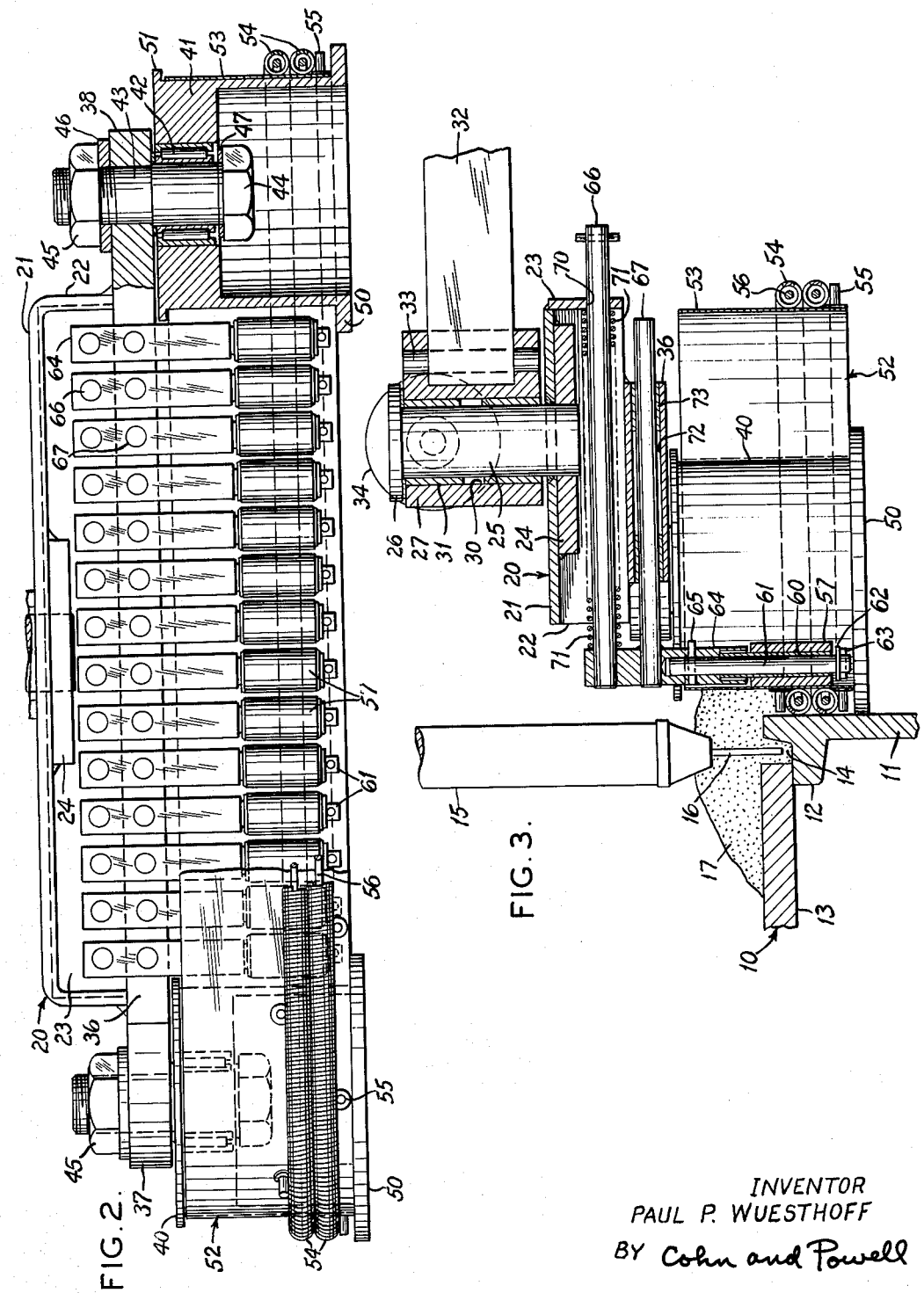
INVENTOR
PAUL P. WUESTHOFF
BY Cohn and Powell
ATTORNEYS

United States Patent Office 3,207,883
Patented Sept. 21, 1965

3,207,883
FLUX-POSITIONING MECHANISM
Paul P. Wuesthoff, St. Louis, Mo., assignor to The Pandjiris Weldment Co., St. Louis, Mo., a corporation of Missouri
Filed Mar. 21, 1963, Ser. No. 266,964
14 Claims. (Cl. 219—73)

This invention relates generally to improvements in a flux-positioning mechanism, and more particularly to an improved flux belt that holds the flux on the workpiece, and to an improved carriage that carries the belt and applies it to the workpiece.

During submerged arc welding, the flux must be deposited continuously on the workpiece along the seam and around the electrode so that the electrode is maintained submerged in the flux at all times as the electrode and workpiece are relatively moved incident to welding. When the weld seam is located near the edge or on the side of the workpiece, means must be provided for supporting a flux bed. Considering difficulty has been encountered in the past in finding a flux belt that is capable of withstanding the high heat generated by the arc welding. The heretofore conventional belts had a very short life because of damage incurred by the transmission of the tremendous heat from the workpiece to the belt that engages the workpiece in the welding zone.

It is an important objective of the present invention to provide a flux belt that is capable of supporting the flux bed in the welding zone without incurring any damage as a result of the heat generated during welding, even though the belt engages the workpiece closely adjacent the welding zone.

An important object is achieved by constructing the flux belt of an endless flexible band and at least one endless coil element such as a coil spring extending around and held to one side of the band. The spring and band support the flux bed, and the line contact between the spring and the workpiece and between the spring and the band minimizes any heat transfer. In addition, the openings provided along the spiral wrapping of the coil wire constituting the coil spring, and the center opening of the coil spring tend to cool the spring and further reduce any possible transmission of heat from the workpiece to the belt.

Another important object is afforded by locating the coil spring in spaced relation to one margin of the band so that the spring and the band area between the spring and said one margin can support a flux bed.

Still another important object is achieved by the novel mounting of the coil spring to the flexible band which allows a flexing action of both the band and the coil spring yet provides a secure attachment.

Other important advantages are realized by having means attached to the band which engage the top and bottom margins of the coil spring, and by having another means that holds the spring against the band. Specifically, the first stated means includes a plurality of projections attached to and extending outwardly from one side of the band, while the second stated means includes an endless cable extending through the interior of the coil spring.

An important object is realized by the mounting of a flux belt of the type described above in a carriage that is movable relative to the workpiece during welding action, the carriage including a pair of spaced wheels having flanges engaging the workpiece to rotate the wheels, the belt being located over the wheels and the coil spring of the belt being pressed by the wheels against the workpiece to provide a flux seal.

Another important object is afforded by the provision of means on the carriage resiliently urging the belt span between the wheels against the workpiece. With this described structural arrangement together with the belt construction of a flexible band and attached coil spring, support is provided for a flux bed regardless of the workpiece contour.

Yet another important object is achieved by the provision of a plurality of rollers engaging the belt span at regularly spaced locations between the wheels, the rollers being urged independently under resilient loading against the belt span so that all portions will conform exactly to the workpiece contour.

It is an important objective to provide a flux belt and carriage mechanism that is simple and durable in construction, economical to manufacture and assemble highly efficient in operation, and which will operate automatically to support a flux bed in the welding zone.

The foregoing and numerous other objects and advantages of the invention will more clearly appear from the following detailed description of a preferred embodiment, particularly when considered in connection with the accompanying drawings in which:

FIG. 2 is a front elevational view, partially cut away and partially shown in cross section, of the flux belt and carriage, and FIG. 3 is a cross sectional view as seen along the line 3—3 of FIG. 1, showing the supported flux and submerged electrode.

Figure 1:
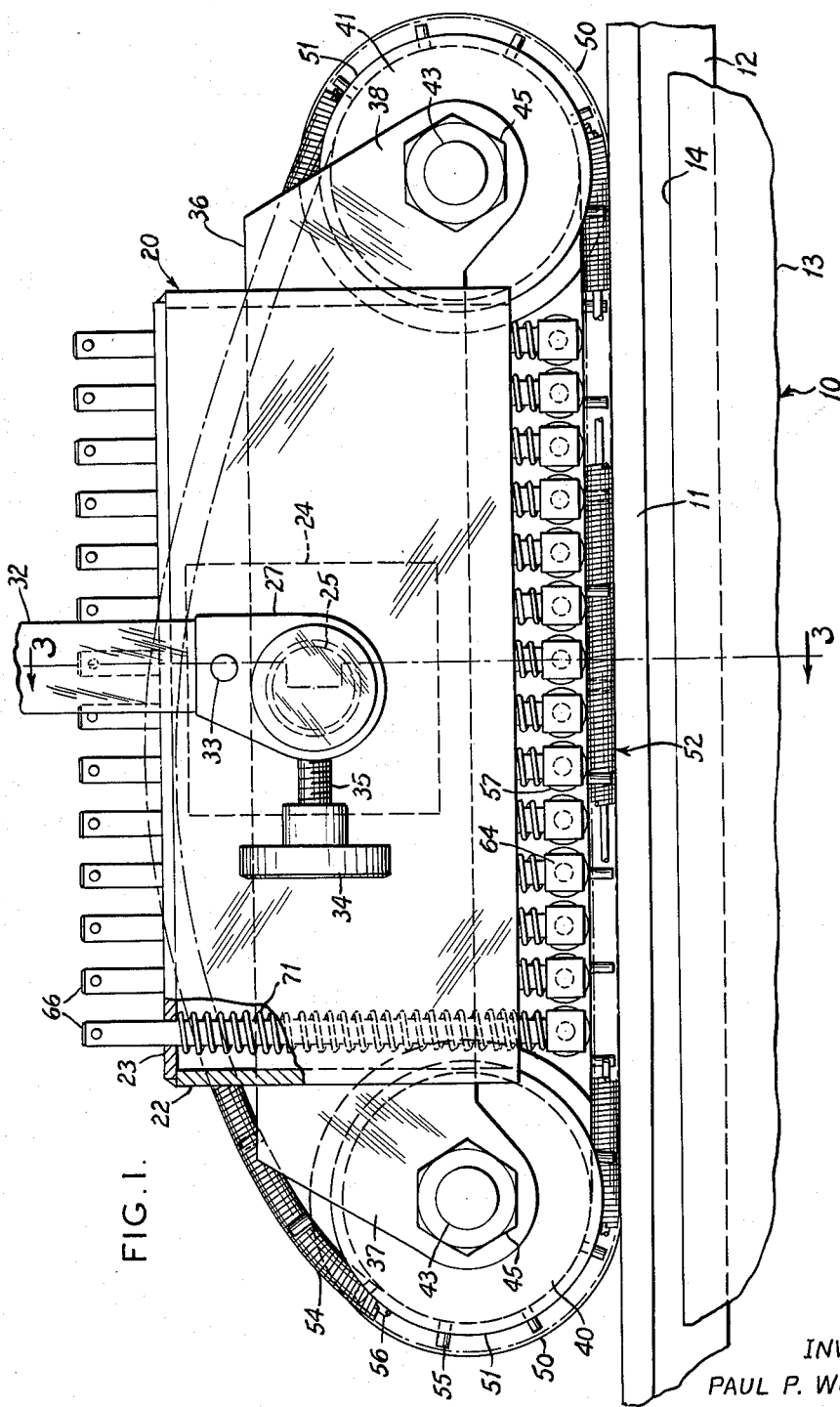
FIG. 1 is a top plan view of the carriage and flux belt applied to a workpiece.

Referring now by characters of reference to the drawings, and first to FIGS. 1 and 3, there is disclosed a typical workpiece generally indicated at 10 with which the flux-positioning mechanism is used. This workpiece 10 includes a substantially vertical side plate 11 having an inwardly projecting ledge 12 spaced below its upper margin, and a substantially horizontal top plate 13 seating on the ledge 12 yet spaced from the side plate 11 to provide a longitudinal welding seam 14.

The welding assembly includes a nozzle 15 having an electrode 16 that is fed continuously to the seam 14. As will be understood, the electrode 16 is completely submerged in the welding zone during welding operation under a bed of flux 17.

The welding assembly also includes a carriage referred to at 20, the carriage 20 including a top body plate 21 with depending end flanges 22 and a depending rear flange 23. A plate 24 is secured as by welding to the underside of the top body plate 21 inside of the end flanges 22 and rear flange 23. A pivot pin 25 is secured to the plate 24 and extends upwardly through the top body plate 21, the pin 25 including a laterally extending head 26 at its uppermost end. Rotatively mounted on the pin 25 is a collar 27. Specifically, the collar 27 includes a bore 30 in which a pair of bushings 31 are located, the bushings 31 receiving the pivot pin 25.

A bar 32 is attached to the collar 27 by a locking pin 33. The bar 32 operates through suitable mechanism to raise or lower the carriage relative to the workpiece and or move the carriage toward or away from such workpiece in order to position the carriage.

It will be readily understood that the carriage can swing about the axis of the pin 25. This pivotal movement of the carriage 20 can be regulated by a lock wheel 34 that is threadedly attached by screw 35 to the collar 27, the end of the screw 35 selectively engaging the pivot pin 25 to retard rotation of the pin 25 in collar 27, and hence retard pivotal movement of the carriage 20.

The carriage 20 further includes an elongate lower body plate 36 attached to and extending between and beyond the end flanges 22 of the upper body plate 21. As will appear best in FIGS. 1 and 2, the lower body plate 36 extends beyond each end of the upper body plate 21 to provide end extensions 37 and 38.

A pair of wheels 40 and 41 are pivotally mounted one to each of the end extensions 37 and 38 respectively on axes parallel to the pivot axis of the carriage defined by pin 25. Because the wheels 40 and 41 are identically mounted, the details of such mounting will be described only with respect to wheel 41 and will suffice for the other wheel 40. It will be noted that a roller bearing 42 is secured to the hub of wheel 41 and receives a stub shaft 43. The stub shaft 43 is provided with a head 44 at its lower end that engages the interior of the wheel hub while the opposite end of the shaft 43 is threaded to receive a nut 45 that engages the top side of the end extension 38. Of course, a washer 46 is located beneath the nut 45 and another washer 47 is located beneath the shaft head 44.

Each of the wheels 40 and 41 includes a lower peripheral flange 50 that engages the front face of the side plate 11 of the workpiece 10, so that upon relative movement of the workpiece 10 and the carriage 20 of the frictional engagement between the side plate 11 and the wheel flange 50 will rotate the wheels 40 and 41. Each of the wheels 40 and 41 includes another smaller peripheral flange 51 at its top portion. These peripheral wheel flanges 51 do not engage the workpiece 10 but merely cooperate with the lower peripheral flanges 50 to position and hold the flux belt referred to generally at 52.

The flux belt 52 includes an endless flexible sheet metal band 53 of a width that closely approximates yet is smaller than the distance between the wheel flanges 50 and 51. At least one endless coil element such as a coil spring 54 extends around the outside periphery of the band 53. In the preferred embodiment, there are two such coil springs 54 arranged in adjacent side-by-side relation. The outside diameter of the coil springs 54, together with the thickness of the metallic band 53, closely approximates the extension of wheel flange 50 so that the wheel 41 presses the springs 54 against the side plate 11 of the workpiece 10 when the wheel flange 50 engages the side plate 11, as is shown best in FIGS. 1 and 3. The coil springs 54 engage the metallic band 53 in a line contact, and similarly engage the workpiece in a line contact also.

Extending from the outermost face of the band 53 are a plurality of projections 55 arranged in staggered vertically spaced relationship about the band 53. Each alternate projection 55 engages the top margin of the upper spring 54 while each other alternate projection 55 engages the bottom margin of the lowermost spring 54. A cable 56 extends through the interior of each of the coil springs 54, the endless cable 56 attaching the coil spring 54 to the band 53 by holding it against the band 53 and between the projections 55. It will be noted that the coil springs 54 are located closer to the bottom margin of the flexible band 53 so that the coil springs 54 and the band area above such springs can support a flux bed as is illustrated in FIG. 3.

The flexible flux belt 52 is merely slipped over the wheel flanges 50 and on to the wheels 40 and 41. The resilient character of the flux belt 52 will hold the band 53 against the wheels 40 and 41 between the wheel flanges 50 and 51. When the carriage 20 is located so that the wheel flanges 50 engage the side plate 11 of the workpiece 10 as shown in FIG. 3. When the carriage 20 is moved relatively to the workpiece 10 so that the wheel flanges 50 rotate the wheels 40 and 41, the wheels 40 and 41 will press the coil springs 54 into engagement with the side plate 11.

It will be importantly noted that upon this relative movement of the carriage and workpiece, the coil springs 54 after once being pressed against the side plate 11 do not move or slide in any way relative to the workpiece. Consequently the flux bed 17 supported by the flux belt 52 is not disturbed by any relative movement of the workpiece 10 and flux belt 52. The electrode 16 moving with the carriage 20 along the welding seam 14 remains submerged in a flux bed 17 that is continuously deposited in the welding zone upon relative movement of the carriage 20 and workpiece 10. The flux belt 52 continuously supports the flux bed 17 in the welding zone.

The band 53 is flexible as are the coil springs 54, therefore it will be understood that both of these elements can flex easily together and independently of the other. This flexing action of the band 53 and coil springs 54 enables the flux belt 52 to follow any contour or surface irregularity of the workpiece 10 and hence support the flux bed 17 under all such conditions.

It will be importantly noted that the flux belt 52 is capable of supporting the flux bed 17 in the welding zone without incurring any damage as a result of heat generated during welding, even though the belt 52 engages the workpiece 10 closely adjacent the welding zone. The line contact between the coil springs 54 and the workpiece 10, and between the coil springs 54 and the band 53 minimizes any heat transfer. In addition, the openings provided along the spiral wrapping of the coil wire constituting the coil springs 54, and the center openings of the coil springs 54 tend to cool the springs and further reduce any possible transmission of heat from the workpiece 10 to the belt 52.

To facilitate the flux belt 52 in conforming to any surface contour, a belt-pressing mechanism is provided on the carriage 20 between the wheels 40 and 41, the belt-pressing mechanism comprising a plurality of independently operable pressers acting on that span of the flux belt 52 applied to the workpiece 10. Each presser includes a roller 57 rotatively mounted on a bushing 60 that is located over a shaft 61. The rotative axis of roller 57 is substantially parallel with the axes of wheels 40 and 41.

The lower end of the shaft 61 is provided with a washer 62 secured by a transverse lock pin 63, the washer 62 retaining the roller 57 in place. The upper end of shaft 61 is located in a bore formed in a key block 64 and is attached to the key block 64 by a transverse pin 65. A pair of rearwardly extending, parallel rods 66 and 67 are secured to the key block 64, rod 66 being located above the rod 67.

The rear flange 23 of the upper body plate 21 is provided with a plurality of holes 70 arranged in a regularly spaced substantially horizontal row. These holes 70 slidably receive the upper rod 66. A compression coil spring 71 is located about each of the rods 66, one end of such spring 71 engaging the rear flange 27 and the other end engaging the key block 64, the spring 71 tending to urge the roller 57 into engagement with the rear side of the belt band 53, and consequently tending to urge the coil springs 54 into engagement with the side plate 11 of the workpiece 10. Because there are a plurality of such rollers 57 along the belt span between the wheels 40 and 41, all portions of the flux belt 52 along the length of such belt span will be pressed into intimate contact with the workpiece 10 regardless of the contour or surface irregularities encountered.

The lower body plate 36 is also provided with a plurality of holes 72 arranged in regularly spaced relation immediately below and aligned with the holes 70 formed in the rear flange 23 of the upper body plate 21. These holes 72 are provided with internal bushings 73 adapted to receive the rods 67 slidably. Thus it is seen that the rods 66 and 67 serve to guide the rollers 57 accurately in a direction toward or away from the belt span between the wheels 40 and 41, the direction of such reciprocative movement being at a right angle to a plane passed between the rotative axes of such wheels 40 and 41.

It is thought that the operational and functional advantages of the flux-positioning mechanism have become fully apparent from the foregoing detailed description of parts, but for completeness of disclosure, the usage will be briefly described.

First the flux belt 52 is slipped over the wheels 40 and 41. The resilient character of the flexible metallic band 53 and coil springs 54 hold the belt 52 on the wheels between the retaining wheel flanges 50 and 51. The tendency of the flux belt 52 is to assume a substantially circular configuration, therefore the belt 52 is urged toward the outside end surfaces of the wheels 40 and 41.

The welding assembly is then adjusted so that the electrode 16 is located in the seam 14, and the flux feed means is adjusted so as to feed flux continuously about the electrode 16 in order to keep it submerged at all times in a flux bed 17. In addition, the carriage 20 is adjusted in a direction toward the workpiece 10 so that the wheel flanges 50 engage the side plate 11. The carriage 20 is also adjusted vertically so that the wheel flanges 50 engage the side plate 11 below the upper edge to enable the coil springs 54 of the flux belt 52 to engage the outside surface of the side plate 11 also.

During welding operation, the electrode 16 and carriage 20 considered as a unit is moved relative to the workpiece 10, the electrode 16 moving relatively along the seam 14, submerged in flux bed 17 that is continuously deposited about the electrode 16. This flux bed 17 is maintained or supported in position adjacent the welding zone at all times by the flux belt 52.

Upon the relative movement of the workpiece 10 and carriage 20, the wheel flanges 50 frictionally engage the surface of the side plate 11 and rotate the wheels 40 and 41. As the lead wheel, for example, wheel 41 rotates, such wheel 41 will continuously press and deliver the coil springs 54 against the side plate 11. As each portion of the flux belt 52 is delivered against the workpiece 10 by the lead wheel 41, an identical portion will automatically bend away from the workpiece 10 and be received over the trailing wheel, as for example wheel 40. The springs 54 contact the side plate 11 in a line engagement and do not move relative to such side plate 11 while in position. Thus it is seen that the flux bed 17 is supported directly by the coil springs 54 and the band region above such coil springs 54, in the welding zone without any disturbance of such bed 17.

The coil springs 54 are flexible in themselves to adapt or conform to any small surface irregularity or surface contour, and in addition, the belt band 53 is flexible to adjust or conform the belt span between the pulleys 40 and 41 to any workpiece contour also. This belt 52 will conform exactly to the workpiece whether the workpiece be straight or curved in either direction in order to provide a dependable support for the flux bed 17.

The rollers 57 are urged against the rear side of the belt band 53 under the loading of pressure springs 71 so as to press the coil springs 54 securely against the workpiece 10 for the full length of the belt span between the wheels 40 and 41. As explained previously, because the rollers 51 are independently operable, all portions of such belt span length will accomodate and conform to every workpiece surface contour. The flux bed 17 will be supported by the flux belt 52 and will be maintained undisturbed for the full length of the belt span between the wheels 40 and 41.

The life expectancy of the flux belt 52 is extremely long in that the component parts of such belt 52 are not easily or quickly damaged by any heat generated during welding operation. The line contact between the coil springs 54 and the workpiece 10, and the line contact between the coil springs 54 and the band 53, as well as the open interior of such coil springs 54 and the spiral openings provided by the wires of such coil springs 54 afford a highly efficient and effective cooling of the belt 52. Heat transfer from the workpiece 10 to the belt 52 is minimized to the greatest possible extent.

Of course, the flux belt 52 can be quickly and easily replaced if necessary merely by moving the belt spans between the wheels 40 and 41 toward each other to provide a greater length in the direction of the wheels so that the band clears the wheel flanges 50. A new flux belt 52 is merely substituted and replaced on the wheels 40 and 41 in a similar manner. When the belt 52 is released, the belt spans tend to move outwardly and thereby constrict the length of such belt 52 in the direction of such wheels 40 and 41 so that the belt 52 is maintained securely on the wheels between the wheel flanges 50 and 51.

Although the invention has been described by making detailed reference to a single preferred embodiment, such detail is to be understood in an instructive, rather than in any restrictive sense, many variants being possible within the scope of the claims hereunto appended.

I claim as my invention:

1. A flux belt comprising:
  (a) an endless flexible band, and
  (b) at least one endless coil element extending around and connected to one side of said band, said coil element engaging, the band in substantially a line contact.

2. A flux belt comprising:
  (a) an endless flexible band,
  (b) at least one endless coil element extending around said band, and
  (c) means holding said coil element on to said band, the coil element having one side engaging the band in substantially a line contact and having an opposite side affording a substantially line contact surface.

3. A flux belt comprising:
  (a) an endless, flexible metallic band,
  (b) at least one endless coil spring extending around said band in spaced relation to one margin and engaging the band in substantially a line contact so that the spring and the band area between the spring and said one margin can support a flux bed, and so that any heat transfer from the coil spring and band is reduced to a minimum, and
  (c) means conecting said spring to said band.

4. A flux belt comprising:
  (a) an endless flexible band,
  (b) at least one endless coil spring extending around said band,
  (c) means attached to said band and engaging the top and bottom of said spring, and
  (d) means holding the spring against said band and between the last said means.

5. A flux belt comprising:
  (a) an endless flexible band,
  (b) at least one endless coil spring extending around said band,
  (c) a plurality of projections attached to and extending outwardly from one side of said band, said projections engaging the top and bottom of said spring, and
  (d) means holding the spring against said band and between said projections.

6. A flux belt comprising:
  (a) an endless flexible band,
  (b) at least one endless coil element extending around said band,
  (c) means attached to said band and engaging the top and bottom of said coil element and
  (d) an endless cable extending through the interior of said coil element and holding said coil element against said band between the last said means.

7. A flux belt comprising:
  (a) an endless flexible band,
  (b) at least one endless coil spring extending around said band,
  (c) a plurality of projections attached to and extending outwardly from one side of said band, said projections engaging the top and bottom of said spring, and
  (d) an endless cable extending through the interior of said coil spring and holding said spring against said band and between said projections.

8. A flux belt comprising:
  (a) an endless flexible sheet metal band,
  (b) at least one endless metallic coil spring extending around said band in spaced relation to one margin of said band, (c) a plurality of projections attached to and extend-outwardly from one side of said band, said projections engaging the top and bottom of said coil spring, and (d) an endless cable extending through the interior of said coil spring and holding said spring against the band in a line contact and between said projections, (e) said coil spring and the band area between the spring and said one margin being adapted to support a flux bed.

9. In a flux-positioning mechanism:
(a) a carriage including a pair of spaced wheels, said wheels having a flange adapted to engage the workpiece and rotate said wheels upon relative movement of the carriage and workpiece,
(b) a flux belt located over said wheels, said belt comprising an endless flexible band, and at least one endless coil element extending around and held to said band in substantially a line contact,
(c) the wheels pressing said coil element against said workpiece in substantially a line contact as the wheels are rotated by operative engagement of the wheel flanges with the workpiece.

10. In a flux-positioning mechanism:
(a) a carriage pivotally mounted for turning about an axis,
(b) a pair of spaced wheels pivotally mounted on said carriage on axes parallel to said carriage axis, said wheels each having a flange adapted to engage the workpiece and rotate said wheels upon relative movement of the carriage and workpiece,
(c) a flux belt located over said wheels, said belt comprising an endless flexible sheet metal band,
(d) at least one endless coil spring extending around the outside face of said band in spaced relation to one margin of said band,
(e) a plurality of projections attached to and extending outwardly from the outside face of said band, said projections engaging the top and bottom of said coil spring, and
(f) an endless cable extending through the interior of said coil spring and holding said coil spring against said band in a line contact and between said projections,
(g) the wheels pressing said spring against said workpiece as the wheels are rotated by operative engagement of the wheel flanges with the workpiece,
(h) a plurality of rollers engaging the rear side of the intermediate portion of the band between said wheels,
(i) at least one rod carrying each roller, said rod being reciprocatively mounted on said carriage for movement of the rollers toward and away from the band between said pulleys,
(j) springs about said rods urging the rollers against the rear side of the band to press said coil spring against said workpiece to follow any contour,
(k) said coil spring and the band area between the coil spring and said one band margin supporting a flex bed.

11. In a flux-positioning mechanism:
(a) a carriage including a pair of spaced wheels, the wheels having a flange adapted to engage the workpiece and rotate the wheels upon relative movement of the carriage and workpiece,
(b) a flux belt located over the wheels, the belt comprising an endless flexible band, and at least one endless coil element extending around the band,
(c) means attached ot the band and engaging the top and bottom of the coil element,
(d) means holding the coil element against the band and between the last said means, the coil element engaging the band in a line contact, and
(e) means carried by the carriage resiliently urging the intermediate portion of the belt between the wheels against the workpiece.

12. In a flux-positioning mechanism:
(a) a carriage including a pair of spaced wheels, the wheels having a flange adapted to engage the workpiece and rotate the wheels upon relative movement of the carriage and workpiece,
(b) a flux belt located over the wheels, the belt comprising an endless flexible band, and at least one endless coil element extending around the band,
(c) a plurality of projections attached to and extending outwardly from one side of the band, the projections engaging the top and bottom of the coil element,
(d) means holding the coil element against the band between the projections, the coil element engaging the band in a line contact,
(e) the wheels pressing the coil element against the workpiece as the wheels are rotated by operative engagement of the wheel flanges with the workpiece, and
(f) means carried by the carriage resiliently urging the intermediate portion of the belt between the wheels against the workpiece.

13. In a flux-positioning mechanism:
(a) a carriage including a pair of spaced wheels, the wheels having a flange adapted to engage the workpiece and rotate the wheels upon relative movement of the carriage and workpiece,
(b) a flux belt located over the wheels, the belt comprising an endless flexible band, and at least one endless coil element extending around the band,
(c) means attached to the band and engaging the top and bottom of the coil element,
(d) an endless cable extending through the interior of the coil element and holding the coil element against the band and between the last said means, the coil element engaging the band in a line contact,
(e) the wheels pressing the coil element against the workpiece as the wheels are rotated by operative engagement of the wheel flanges with the workpiece, and
(f) means carried by the carriage resiliently urging the intermediate portion of the belt between the wheels against the workpiece.

14. In a flux-positioning mechanism:
(a) a carriage including a pair of spaced wheels, the wheels having a flange adapted to engage the workpiece and engage the wheels upon relative movement of the carriage and workpiece,
(b) a flux belt located over the wheels, the belt comprising an endless flexible band, and at least one endless coil element extending around the band,
(c) a plurality of projections attached to and extending outwardly from one side of the band, the projections engaging the top and bottom of the coil element,
(d) an endless cable extending through the interior of the coil element and holding the coil element against the band and between the projections, the coil element engaging the band in a line contact,
(e) the wheels pressing the coil element against the workpiece as the wheels are rotated by operative engagement of the wheel flanges with the workpiece, and
(f) means carried by the carriage resiliently urging the intermediate portion of the belt between the wheels against the workpiece.

References Cited by the Examiner

UNITED STATES PATENTS

| | | | |
|---|---|---|---|
| 2,698,891 | 1/55 | Meyer | 219—126 |
| 3,035,159 | 5/62 | Deville et al. | 219—137 |

RICHARD M. WOOD, *Primary Examiner.*